Patented Mar. 27, 1923.

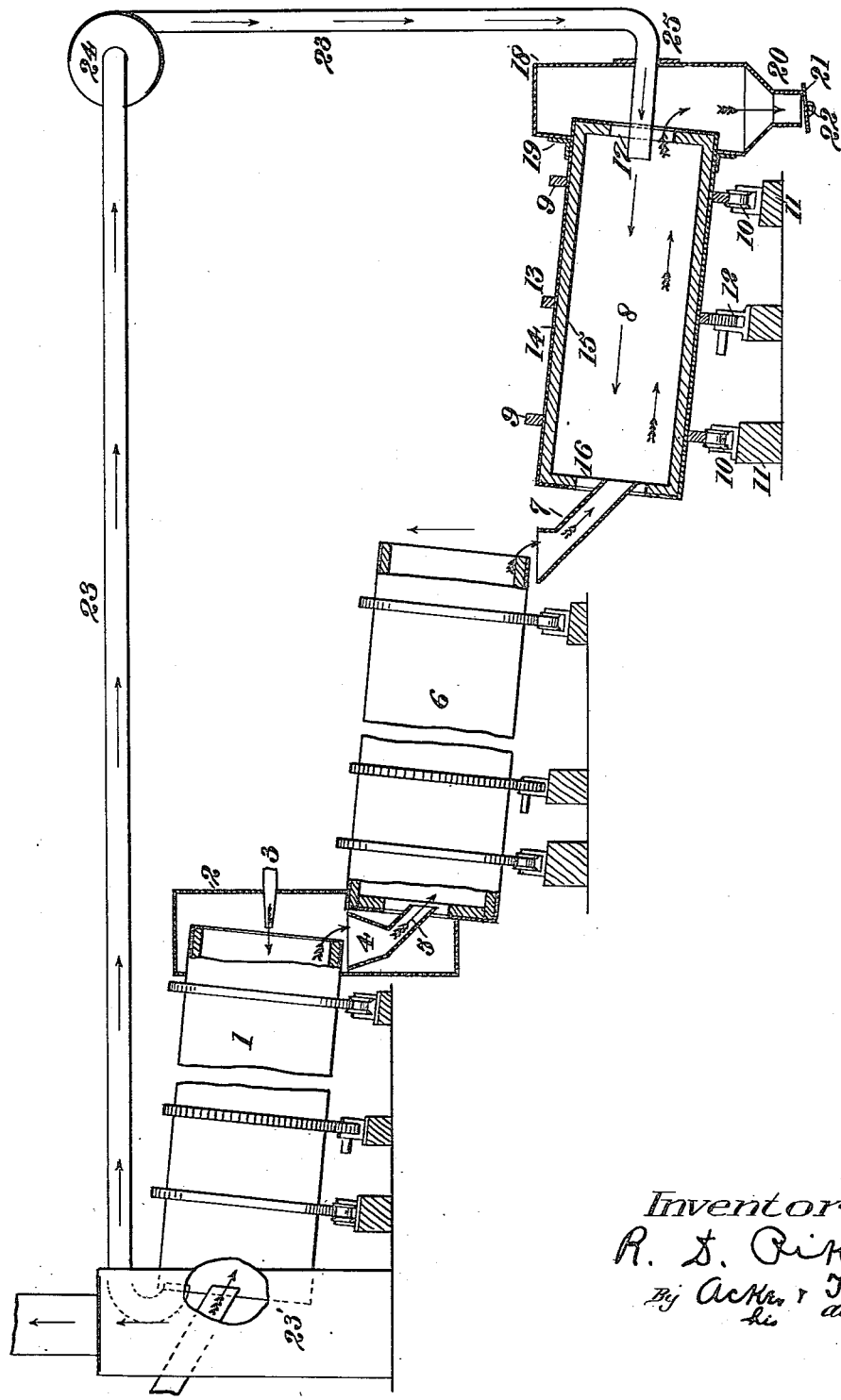

1,449,696

UNITED STATES PATENT OFFICE.

ROBERT D. PIKE, OF SAN FRANCISCO, CALIFORNIA.

METHOD OF TREATING MAGNESITE.

Application filed January 20, 1921. Serial No. 438,662.

To all whom it may concern:

Be it known that I, ROBERT D. PIKE, a citizen of the United States, residing at the city and county of San Francisco and State of California, have invented certain new and useful Improvements in Methods of Treating Magnesite, of which the following is a specification.

The hereinafter described invention relates to a method of treating calcined magnesite for reducing the free or water soluble lime contained therein to a minimum per cent for rendering the same a neglible quantity in the use of the said material for the manufacture therefrom of oxychloride cements, mortars and concretes, which per cent of free or water soluble lime constituent of the magnesite is not permissible for the production of a uniform standard product to exceed about three per cent (3%), for if free or water soluble lime in excess of about three per cent is present in the calcined magnesite from which the oxychloride cement is formed, articles produced therefrom will not possess the requisite strength, to stand up under the stresses to which the same are usually subjected and required to sustain.

In all crude magnesite lime occurs as an impurity, usually in the form of calcium carbonate in varying amount. It is required for the production of satisfactory plastic magnesite by present methods that the lime contents (CaO) in any form in the finished product shall not exceed four to five per cent, corresponding to 2 to 2.5% in the crude magnesite.

The object of the present invention is to render available for use in the oxychloride cement industry crude magnesites which are at present not available for such use because of their high content of carbonate of lime, and to improve this quality of calcined magnesites for use in oxychloride cements made from crude magnesite containing lime carbonate in any quantity whatsoever by reducing to a uniform minimum per cent the free or soluble lime content of the calcined material.

Preferably, the invention is carried out as a continuous method, although such is not an essential step in the invention, which resides in subjecting the magnesite after its calcination to the action of a body of gas containing $CO_2$ and a trace of water vapor (as, for example, flue gas from a calcining furnace) and causing the said gas to inter- mix with the said material after calcination, whereby the $CO_2$ contents of the gas enters into combination with the free lime (CaO) constituents of the magnesia, rather than with the magnesia (MgO), and the free lime (CaO) is converted into a carbonate and rendered substantially insoluble in water, whereby the per cent of the free lime is reduced to a minimum and calcined magnesia produced of high grade.

In carrying out my invention the reaction which takes place by the introduction of the gas containing $CO_2$ does not affect the MgO contents which remains unaltered. The only change which takes place is the conversion of the soluble lime into lime substantially insoluble in water, and by so doing giving a resultant product of high grade from raw materials heretofore considered valueless for the purpose of producing therefrom of plastic magnesite due to their high content of carbonate of lime.

The invention essentially resides in the discovery that if a mixture of lime (CaO) and magnesia (MgO), that is calcined lime and calcined magnesite, be heated in a suitably closed vessel in contact with a body of gas containing $CO_2$ and a trace of water vapor, for example flue gas from a calcining furnace, the $CO_2$ contents of the gas enters into combination with the lime (CaO) rather than with the magnesia (MgO), the reaction taking place to best advantage when the mixture of MgO and CaO is heated to a temperature of about 500° C., but this reaction begins at about 300° C. and continues to about 600° C. If such a mixture, by analysis, for example, containing 4% of free or water soluble lime be treated in a closed vessel at a temperature of 500° C. to the action of a gas containing twenty-five (25) to thirty (30) per cent $CO_2$ and traces of water vapor, such as for example flue gas from a calcining furnace, the temperature of the material rises in the interval of approximately one-half hour to substantially 520 to 530° C. and an analysis of the resultant product discloses that less than one per cent (1%) of free or water soluble lime is present. The reaction which takes place is a simple carbonation of lime, as follows:—

$$CaO + H_2O = Ca(OH)_2$$
$$Ca(OH)_2 + CO_2 = CaCO_3 + H_2O.$$

By the utilization of the present invention I am able to produce a high grade of calcined magnesite for the manufacture therefrom of oxychloride cements from raw or crude materials heretofore considered valueless for such purpose because of their high contents of carbonate lime, thereby materially reducing the cost incident to the production of ground calcined magnesite for use as plastic magnesite.

Any suitable apparatus may be employed for the carrying out of the method invention, one form of an apparatus being disclosed by the accompanying sheet of drawings, wherein is illustrated a part sectional side elevation.

In the drawings, the numeral 1 designates an ordinary calcining furnace of the rotary type, provided with the usual firing hood 2 and burner 3. From the lower end of the downwardly inclined rotary furnace 1 is extended a discharge spout 4, which delivers the calcined material into a chute 5 extended into the upper end of a rotary cooler 6. The material discharging from the lower end of the rotary cooler is conveyed or directed by a downwardly inclined chute 7 into the upper end of a horizontally disposed, slightly inclined, rotating cylindrical vessel 8. This vessel is provided exteriorly with spaced circumferentially disposed treads 9, which work over the roller cradles 10, supported on the foundations 11.

In the present case rotation is imparted to the vessel 8 from any suitable source of motive power, through the medium of the driven gear 12 intermeshing with the gear ring 13 secured to and surrounding the vessel 8. The said vessel is composed of an outer steel shell 14, provided with an interior lining of fire brick 15, and is formed with an upper restricted inlet opening 16 and a lower restricted outlet opening 17. The lower end of the rotating vessel is surrounded by a sheet metal hood 18, which is placed in close and practically gas tight contact with the rotating vessel through the medium of a running seal 19. The treated material discharging through the restricted outlet 17 enters within the discharge spout 20 extended from the hood 18, and is discharged therefrom through the medium of an oscillating control gate 21 of suitable design, which oscillates around the axis 22. Motion is imparted to the rocking or oscillating gate 21 in any suitable manner, so that the pile of treated material resting thereon is partially discharged therefrom at each oscillation.

From the upper end of the rotary kiln 1 extends a pipe 23, which passes through the stack base 23', and enters the lower end of the rotary vessel 8, passing through the firing hood 18 and being made air tight by the joint 25. Connected with the pipe 23 and interposed at a suitable point intermediate the kiln or furnace 1 and the rotary vessel 8 is interposed a suction fan 24, which draws a portion of the flue gas from the calcining furnace 1, the gas thus drawn out containing about twenty-five per cent (25%) $CO_2$ and traces of water vapor and discharges the same into the vessel 8. In this vessel the $CO_2$ contained in the flue gas attacks the free or water soluble lime (CaO) of the magnesite under treatment and converts it into the carbonate and renders the same substantially insoluble in water, so that the resultant product discharged from the apparatus has the minimum per cent or a neglible quantity of soluble lime therein and a uniform standard product is the result. The calcined material or magnesite which discharges from the lower end of the rotating vessel 8 is practically free from soluble lime and this regardless of the quantity of the soluble lime which may have been present in the material when discharged from the kiln 1, or from the cooler 6. Practical experiments have proven that one hour is sufficient for treatment of the material in the vessel 8, it being understood that no external heat is utilized in connection with the treatment of the calcined material while contained within and passing through said vessel. It will be understood that the gas containing the $CO_2$ applied to the magnesite under treatment may be applied at any desired point of the apparatus, as for instance within the cooler 6, but preference is given to associating with the calcining apparatus proper the auxiliary horizontally disposed rotating vessel 8 and introducing the flue gas containing the $CO_2$ and trace of water vapor into said vessel to cause reaction of the soluble lime contents of the calcined magnesite contained therein for treatment.

In the treatment of the crude or raw material the same is subjected while passing through the rotary furnace 1 to a heating temperature of approximately 800° to 950° and in the present case leaves the said structure as calcined magnesite containing the soluble lime to be converted into a carbonate. This calcined material being a mixture of lime CaO and magnesia MgO passes into and through the cooler 6, its temperature being reduced to approximately 400° C, and is in condition at which it is usually ground for the manufacture therefrom of plastic magnesite. As delivered into the rotary vessel 8 the calcined material is brought into intimate contact with the gas containing the $CO_2$ and trace of water vapor and the soluble or free lime contained in the calcined material is converted into the carbonate and rendered substantially insoluble in water.

In carrying out the method invention it is preferable that the calcining temperature be not in excess of 950° C. because at and above this temperature the lime (CaO) contained within the raw material under treatment will combine with the silica ($SiO_2$)

present to form silicates which may, because of their property of slowly hydrating, prove injurious to the oxychloride cement. I have found that 800° to 950° C. is the range of calcining temperature for obtaining the best results. The choice of temperature in the higher or lower portion of this range will depend upon the material being treated. The magnesium carbonate constituent of most rocks is thoroughly and rapidly calcined, to such a degree as to give the best quality of oxychloride cement, at about 850° C. At this temperature some of the calcium carbonate present will be calcined, causing free or water soluble lime (CaO) to be present in the calcined product.

The proportion of calcium carbonate which will be calcined at 850° C. will depend upon its physical nature—that is, whether it is amorphous or crystalline, and also upon the per cent of $CO_2$ present in the furnace atmosphere. Experience shows that if more than 2 to 2½% lime (CaO) be present in the original rock as calcium carbonate, the resulting calcined product will produce an inferior grade of oxychloride cement, because of the presence of free lime or soluble lime, that is lime as CaO or as $Ca(OH)_2$. On the other hand, the calcination of the lime could be prevented almost entirely by using a lower calcining temperature, but this is objectionable because the capacity of any given calcining furnace is reduced by lowering the calcining temperature and because the calcined magnesite produced at temperatures sufficiently low to assure that little or no lime shall be calcined, makes an inferior grade of oxychloride cement. It is thus seen that when the original rock contains more than 2 to 2½% of lime (CaO) in the form of calcium carbonate there will be sufficient free or water soluble lime in the calcined product to injure the quality of the oxychloride cement made therefrom.

It will be noted that in carrying out my process invention there are required no additional materials and it can therefore be conducted very cheaply. Any suitable means of bringing the flue gas containing $CO_2$ into contact with the hot calcined material may be employed and the process is not necessarily carried out in connection with the calcination for the free lime content of calcined magnesite, remote from its point of calcination, but can be reduced to less than 1% by heating the material to a temperature of about 500° C. in any suitable enclosed vessel, and when so heated bringing it into contact with gas containing $CO_2$. The gas for this purpose may, for example, be obtained from the gases of combustion of the fuel used in heating the calcined magnesite to the requisite temperature of about 500° C.; although such gases contain only about one-half the concentration of $CO_2$ as do those withdrawn from the upper end of the kiln, they will attack the lime (CaO) in the same manner but at a slower rate.

By the expression flue gas containing $CO_2$ is not to be understood as meaning a specific form of gas, as for instance that taken from the calcining furnace, for, any suitable gaseous medium containing $CO_2$ with a trace of water vapor may be employed which will cause the necessary reaction for converting the free or soluble lime contained in the calcined magnesite into carbonate, or cause the re-carbonization of the lime constituent of the calcined magnesite.

While the invention has been described in connection with the treatment of calcined magnesite for the conversion of the soluble lime contents thereof to insoluble lime, it will be understood that the invention is equally as well adapted for the treatment of calcined dolomite for the conversion of its soluble lime contents to insoluble lime, and by the expression "calcined magnesite" is to be understood as including dolomite and natural or artificial mixtures of calcium carbonate and magnesium carbonate.

Having thus described my invention, what I claim as new and desire to protect by Letters Patent is:—

1. The method of treating calcined magnesite for reducing the soluble lime constituent thereof, which consists in subjecting the material while heated to a temperature of approximately 300° to 600° C. to the action of gas containing $CO_2$.

2. The method of treating calcined magnesite, which consists in subjecting the same to agitation within a closed vessel while heated to a temperature of substantially 300° to 600° C. and introducing within said vessel a gas containing $CO_2$ and a trace of water vapor whereby the $CO_2$ contents of the gas react on the free lime of the material for the reduction of its solubility.

3. The method of treating crude magnesite containing lime, which consists in subjecting the same to calcination and thence while in a closed vessel and at a temperature of approximately 300° to 600° C. introducing a gas containing $CO_2$ and a trace of water vapor, causing said gas to react with the material for the reduction of the soluble lime constituent thereof.

4. The method of treating crude magnesite containing lime, which consists first in calcining the said material and thence subjecting the same while maintained under agitation at a temperature of approximately 300° to 600° C. to the action of a gas containing $CO_2$, whereby the said $CO_2$ reacts with the soluble lime constituent of the material and causes a re-carbonization thereof.

5. The continuous method of treating crude magnesite containing lime for the manufacture of plastic magnesite, which consists in first calcining the material, then reducing the temperature of the material, then treating the material under agitation in a closed vessel while at a temperature of approximately 300° to 600° C. and introducing into said vessel for reacting with the material a gas containing $CO_2$ to react with the soluble lime constituents of the material and cause a reduction of the solubility thereof.

6. The method of treating calcined magnesite for the reduction of the soluble lime constituent thereof, which resides in subjecting the calcined material while heated to a temperature less than that of calcination to a gas containing $CO_2$ until the reaction of said $CO_2$ with the soluble lime causes a re-carbonization thereof.

7. The method of treating magnesite containing lime for the re-carbonization of the lime constituent, which consists in calcining the material and thence subjecting the same at a temperature less than that required for calcination to the action of a gas containing $CO_2$ for reaction with the soluble lime contents of the material to cause the re-carbonization thereof.

8. The method of treating calcined magnesite for the re-carbonization of its soluble lime contents, the same comprising the subjecting of the material while under agitation and at a temperature less than that required for calcination to the action of a gas containing $CO_2$ for reaction with the soluble lime contents of the material and recarbonization thereof.

9. The method of treating crude magnesite containing lime for re-carbonization of the said lime, which consists in calcining the material within a calcining furnace, thence passing the calcined material through a rotating vessel while at a temperature less than that required for calcination, and subjecting the material while in said vessel to the action of flue gases withdrawn from the calcining furnace and passed into the vessel, whereby the $CO_2$ contents of the flue gas attacks the soluble lime of the material and causes the recarbonization thereof.

10. The method of producing calcined magnesite substantially free of the soluble lime which consists in first calcining the magnesite and while at a temperature less than that required for calcination subjecting the same to the action of a gas containing $CO_2$, whereby the free lime contents is recarbonized.

11. The method of treating calcined magnesite containing soluble lime, which consists in passing the calcined material through a rotating vessel while maintained at a temperature less than that required for calcination and subjecting the same during its path of travel to a counter flowing stream of gas containing $CO_2$ introduced within said vessel, whereby the said gas intermixes with the material and the $CO_2$ contents react with the soluble lime of the material for the recarbonization thereof.

12. The method of treating calcined magnesite, for the conversion of the soluble lime constituent thereof, which resides in heating the magnesite to a temperature sufficient to cause the requisite reaction, thence subjecting the same to the action of a gaseous body containing $CO_2$ until the reaction of the said $CO_2$ converts the soluble lime into insoluble lime.

13. The method of treating magnesium carbonate for the production of a calcined material substantially free from water soluble lime, which consists in subjecting the same to calcination and then treating the calcined material while at a temperature lower than the dissociation temperature of the material with a gas containing $CO_2$.

14. The method of treating mixtures of magnesia and lime for changing the lime contents thereof to calcium carbonate, which consists in treating the mixture with a gas containing $CO_2$ at any temperature below the temperature of dissociation of calcium carbonate.

In testimony whereof I have signed my name to this specification.

ROBERT D. PIKE.